Figure 1:
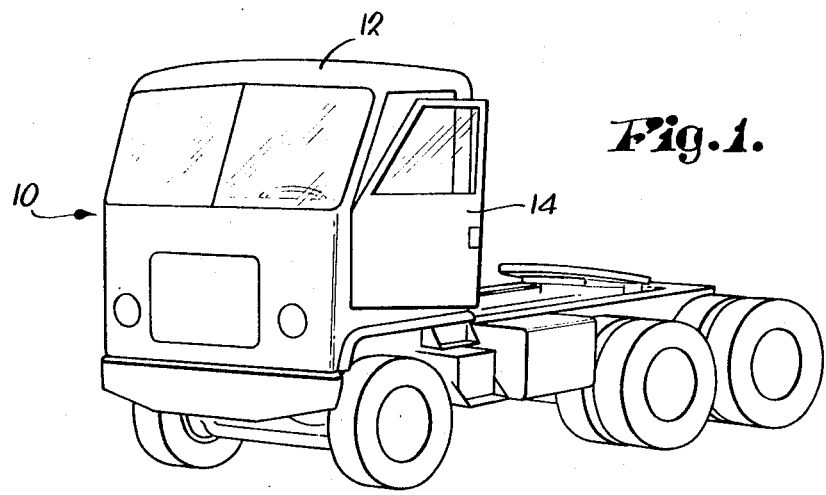

United States Patent
Sprouse

[15] 3,651,457
[45] Mar. 21, 1972

[54] WARNING SYSTEM FOR VEHICLES WITH AIR-TYPE PARKING BRAKES

[72] Inventor: Reuben Sprouse, Route 2, Trenton, Mo. 64683

[22] Filed: Aug. 14, 1970

[21] Appl. No.: 63,701

[52] U.S. Cl. .................................340/69, 188/1 A, 340/52 D
[51] Int. Cl. ..........................................................B60t 17/22
[58] Field of Search......................340/52, 59, 60, 69, 71, 72; 188/1 A, 151 A, 170

[56] References Cited

UNITED STATES PATENTS

| | | | |
|---|---|---|---|
| 2,525,461 | 10/1950 | Schnell | 188/170 X |
| 2,740,947 | 4/1956 | Davies | 340/52 |
| 3,232,175 | 2/1966 | Cox et al. | 188/151 A X |
| 3,233,153 | 2/1966 | Ryan | 340/52 UX |
| 3,516,525 | 6/1970 | Skaggs | 188/170 X |

OTHER PUBLICATIONS

German printed application 1,059,783 of Westinghouse Bremsen –G.m.b.H. 6–1959.

*Primary Examiner*—John W. Caldwell
*Assistant Examiner*—Kenneth N. Leimer
*Attorney*—Schmidt, Johnson, Hovey & Williams

[57] ABSTRACT

A system for pneumatically sensing failure of a vehicle operator to relieve the pneumatic pressure preventing setting of a spring-set, air-released type parking brake which employs an electric circuit containing an alarm device, a switch responsive to pressure in the pneumatic line to the brake cylinder, and a switch operated by opening the door of the vehicle to activate the warning system as the operator is about to leave the vehicle.

1 Claims, 2 Drawing Figures

PATENTED MAR 21 1972　　　3,651,457

INVENTOR.
Reuben Sprouse

BY
Schmidt, Johnson, Hovey,
Williams & Chase
ATTORNEYS.

WARNING SYSTEM FOR VEHICLES WITH AIR-TYPE PARKING BRAKES

This invention relates generally to the field of warning or alarm devices and, more particularly, to a warning system for motor vehicles such as trucks, by which an operator of the vehicle may be warned of an inadvertent failure to set the parking brake of the vehicle immediately upon his commencing to leave the vehicle.

It has long been a serious problem in the trucking industry that heavy vehicles may, when parked, roll away under their own weight with increasing momentum on any downslope, if the operator of the vehicle fails to properly set the parking brake thereof prior to leaving the parked vehicle. Accidents resulting from inadvertent failure of truck operators to properly set the parking brake of the vehicle prior to leaving have resulted both in personal injury and serious property damage, and such oversights constitute one of the more frequent causes of accidents in an industry that is otherwise noted for its adherence to safety rules and its accomplishment in minimizing accidents in moving vehicle situations.

Accordingly, it is the primary object of this invention to provide an alarm system for use on trucks and other vehicles employing air actuated type parking brakes, which will positively warn a vehicle operator of any failure on his part to set the parking brake prior to his leaving the vehicle.

Another important object of the invention is to provide such a warning system which is directly responsive to the pneumatic pressure conditions in the air conduit that controls actuation of the parking brake of the vehicle.

It is still another important object of the invention to provide such a system which is activated for producing a warning signal by opening of the door of the vehicle by its operator prior to leaving the vehicle, and which prevents undesired operation of the warning system during periods when the parking brake is not set and the door is closed.

Still other important objects of the invention will be made clear or become apparent to those skilled in the art from the drawings and the description of a preferred embodiment of the invention that follows.

Figure 2:
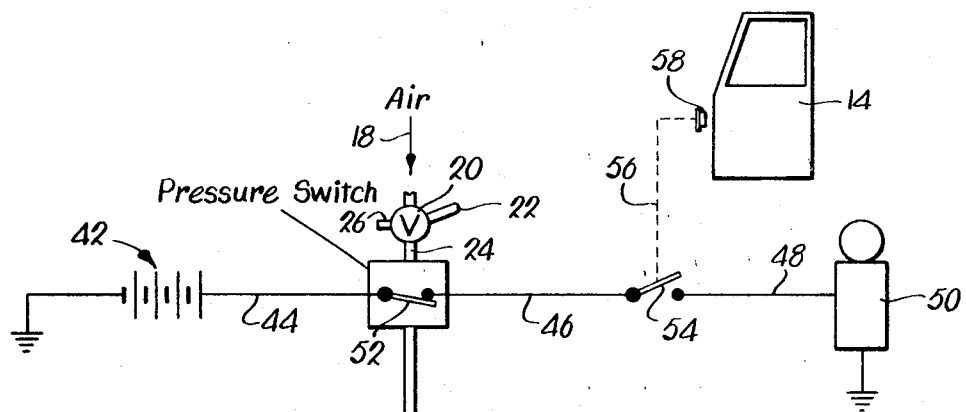
Figure 2:
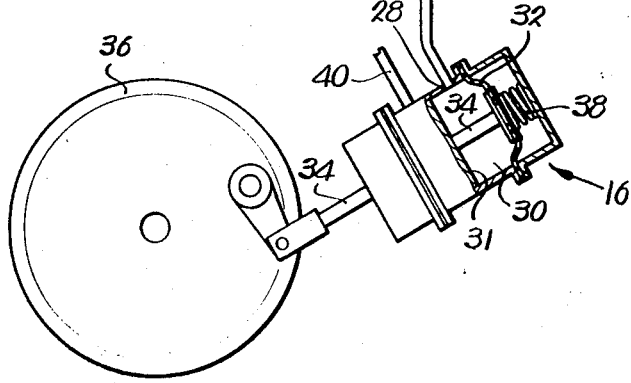

In the drawing:

FIG. 1 is a perspective view of a vehicle of the general class with which this invention is primarily adapted for use; and FIG. 2 is a schematic view of the apparatus of the invention as applied in combination with the associated parts of a vehicle having an operative relationship with the warning system of the invention.

In the drawings, a truck or similar vehicle provided with pneumatic controlled parking brake apparatus is generally designated by the numeral 10. The vehicle 10 includes an operator cab 12 having a swingable door 14 thereon for ingress and egress of the operator. The vehicle 10 is provided with a parking brake control mechanism generally designated 16, which includes a source of air under pressure indicated by the arrow 18 in FIG. 2, a manually operable valve 20 having an operating lever 22 and an exhaust vent 26 coupled in series with a conduit 24 leading to a cylinder 28. The cylinder 28 is provided with a chamber 30 defined by the cylinder walls, an inner wall 31, and a flexible diaphragm 32. A reciprocable rod 34 within the chamber 30 is operably coupled with the diaphragm 32 and in conventional fashion with braking means 36 for holding some or all of the wheels of the vehicle 10 against rotation when the rod 34 shifts axially in a downward and leftward direction as illustrated in FIG. 2. It will be understood that each of the vehicle wheels to be subjected to the action of the control mechanism 16 will be provided with a cylinder 28, and that the conduit 24 will actually branch to each of such cylinders 28.

Within the cylinder 28 is a compression spring 38 normally bearing against the diaphragm 32 in a direction for activating the braking means 36. It will be in wheel-holding condition under the influence of the spring 38 upon the rod 34, except when a suitable fluid pressure is supplied to the chamber 30 of cylinder 28 through the pneumatic conduit 24 connected therewith. Thus, during running of the vehicle 10, the valve 20 in series with the conduit 24 will normally be open to supply air from the source 18 to the chamber 30 for flexing the diaphragm 32 against the action of spring 38 to withdraw the rod 34 and thereby release the holding action of the brake means 36.

When the vehicle 10 is parked and it is desired to activate the wheel-holding action of braking means 36, the operating lever 22 of valve 20 is manually shifted by the operator before leaving the vehicle 10 to a position venting the portion of conduit 24 leading to the cylinder 28 to the atmosphere through the vent port 26, such valve 20 simultaneously closing the conduit 24 to the source 18. When the fluid pressure from the chamber 30 is thus permitted to escape through the vent port 26, the spring 38 will drive rod 34 to actuate and set the braking means 36 to hold the wheels of the vehicle 10 immobile while it is parked and until the operator returns the operating lever 22 of valve 20 to its normal position, thereby restoring fluid pressure to conduit 24 to shift the diaphragm 32 and overcome the force of the spring 38.

A second conduit 40 is fragmentarily illustrated in FIG. 2 as communicating with a second chamber (not shown) of the cylinder 28 on the left side of the inner wall 31. A second diaphragm in such chamber is also coupled with the rod 34 to provide the primary operating brakes of the vehicle. Those skilled in the art will understand that the conduit 40 may conventionally lead through a foot pedal operated valve (not shown) to the source 18 to provide selective braking action during moving operation of the vehicle 10.

Referring now particularly to FIG. 2 in which a preferred embodiment of the alarm system of this invention is shown in its operative relationship with various parts of the vehicle 10, a source of electric power, which may be either the battery of the vehicle 10 or a separate battery or electric power source carried by the vehicle 10, is designated by the numeral 42. The battery 42 is coupled by electric circuit means including conductors 44, 46, 48 and ground with an audible alarm device 50, such as a buzzer or bell. Interposed in series with such circuit means is a pressure sensitive electric switch 52 pneumatically coupled with the conduit 24 and so arranged that switch 52 will normally remain closed while conduit 24 is under pressure, but the switch 52 will immediately open upon the relief of pressure within conduit 24 resulting whenever the lever 22 of valve 20 is shifted to its venting or parking brake setting position.

Thus, without venting, the switch 52 will be closed to complete its part of the previously defined circuit whenever air pressure is being supplied from source 18 through valve 20 and conduit 24 to chamber 30 to maintain the braking means 36 in released or inactive condition.

A normally open switch 54 is also interposed in series with the above mentioned circuit, and switch 54 is so disposed or is operably connected, as indicated by the dotted line 56 in FIG. 2, with means 58 responsive to opening of the door 14 of vehicle 10 that switch 54 is closed whenever door 14 is opened. Thus, whenever the door 14 is closed, the switch 54 remains open to deactivate the alarm system of the invention. However, the moment that an operator of the vehicle opens the door 14 in preparation for leaving the vehicle 10 after parking, the switch 54 will close and, unless the operator has shifted the lever 22 of valve 20 to its venting or parking brake setting position, the switch 52 will also remain closed and the alarm 50 will emit its warning signal.

It will, therefore, be appreciated that the invention is adapted to achieve its objects in positive and straight-forward manner with reliable structure that is economical to manufacturer, convenient to install, and requires little or no maintenance. Those skilled in the art will appreciate that various minor modifications and changes could be made from the details of construction of the preferred embodiment of the invention disclosed for illustrative purposes without departing from the true intent and spirit of the invention.

I claim:

1. A warning system for a vehicle with air type parking brakes, said vehicle having an operator cab, an openable access door on said cab, a source of electrical power, and a source of fluid pressure, the system comprising:
   a spring actuated parking brake operably coupled by a conduit with said pressure source and normally maintained in released condition by said pressure in opposition to the spring;
   a manual valve in the cab for relieving the pressure in said conduit to cause said spring to set said brake;
   electrically responsive alarm means mountable on said vehicle and adapted when actuated to produce a warning signal, said alarm means including means for producing an audible signal;
   circuit means for electrically coupling said alarm means with said power source;
   first electrical switch means operably coupled with said conduit and electrically coupled in series with said circuit means, said first switch means being normally closed when said pressure is maintained in said conduit and said brake is in said released condition, said first switch means being openable upon actuation of said valve to relieve pressure in said conduit and set said brake;
   second, normally open electrical switch means electrically coupled in series with said circuit means and adapted, upon closure thereof, for completing an electrical connection from said power source to said alarm means when said first switch means is closed to test the pressure condition in said conduit; and
   means operably coupling said door with said second switch means for closing the latter when the door is opened by the operator for egress from the vehicle, whereby said alarm means produces said warning signal as the operator is leaving the vehicle if the operator has failed to actuate said valve to relieve said pressure and set said brake.

* * * * *